United States Patent
Chitgupakar et al.

(10) Patent No.: US 11,281,438 B2
(45) Date of Patent: Mar. 22, 2022

(54) PLATFORM FOR WEB SERVICES DEVELOPMENT AND METHOD THEREFOR

(71) Applicant: Modak Technologies FZE, Dubai (AE)

(72) Inventors: Milind Chitgupakar, Hyderabad (IN); Aarti Joshi, Hyderabad (IN); Sai Sandeep Neeli, Hyderabad (IN)

(73) Assignee: Modak Technologies FZE, Dubai (AE)

( * ) Notice: Subject to any disclaimer, the term of this patent is extended or adjusted under 35 U.S.C. 154(b) by 0 days.

(21) Appl. No.: 17/181,342

(22) Filed: Feb. 22, 2021

(65) Prior Publication Data
US 2021/0318857 A1    Oct. 14, 2021

(30) Foreign Application Priority Data
Apr. 9, 2020    (IN) .............................. 202011015510

(51) Int. Cl.
| | |
|---|---|
| G06F 9/44 | (2018.01) |
| G06F 8/36 | (2018.01) |
| G06F 8/33 | (2018.01) |
| G06F 9/54 | (2006.01) |
| G06F 16/9532 | (2019.01) |
| G06F 40/186 | (2020.01) |

(52) U.S. Cl.
CPC ............... *G06F 8/36* (2013.01); *G06F 8/33* (2013.01); *G06F 9/547* (2013.01); *G06F 16/9532* (2019.01); *G06F 40/186* (2020.01)

(58) Field of Classification Search
None
See application file for complete search history.

(56) References Cited

U.S. PATENT DOCUMENTS

| | | | |
|---|---|---|---|
| 2009/0172636 A1* | 7/2009 | Griffith | G06F 8/20 717/113 |
| 2012/0072597 A1* | 3/2012 | Teather | G06F 9/5072 709/226 |
| 2014/0156816 A1* | 6/2014 | Lopez Da Silva | H04L 41/0813 709/221 |
| 2018/0004576 A1* | 1/2018 | Gokurakuji | G06F 9/46 |
| 2018/0018192 A1* | 1/2018 | Gokurakuji | H04L 41/20 |
| 2018/0284715 A1* | 10/2018 | Saunders | G06F 16/903 |
| 2018/0329700 A1* | 11/2018 | Doshi | H04L 41/12 |
| 2021/0306233 A1* | 9/2021 | Keller | H04L 41/5051 |

* cited by examiner

*Primary Examiner* — Anna C Deng
(74) *Attorney, Agent, or Firm* — FisherBroyles LLP; Kevin D. Jablonski

(57) ABSTRACT

A web services development platform and a method therefore is provided. The web services development platform comprises a central repository having stored therein a set of templates related to web services. The web services development platform further comprises a server including a processing system and a memory device. The memory device has instructions stored thereon that cause the processing system to perform operations comprising receiving a web service request from a user; selecting one or more templates from the set of templates based on the web service request; stringing the selected one or more templates to generate a cascaded template; and deploying the generated cascaded template in the form of an application programming interface (API) configured to establish communication with one or more of an external database and an external application.

13 Claims, 4 Drawing Sheets

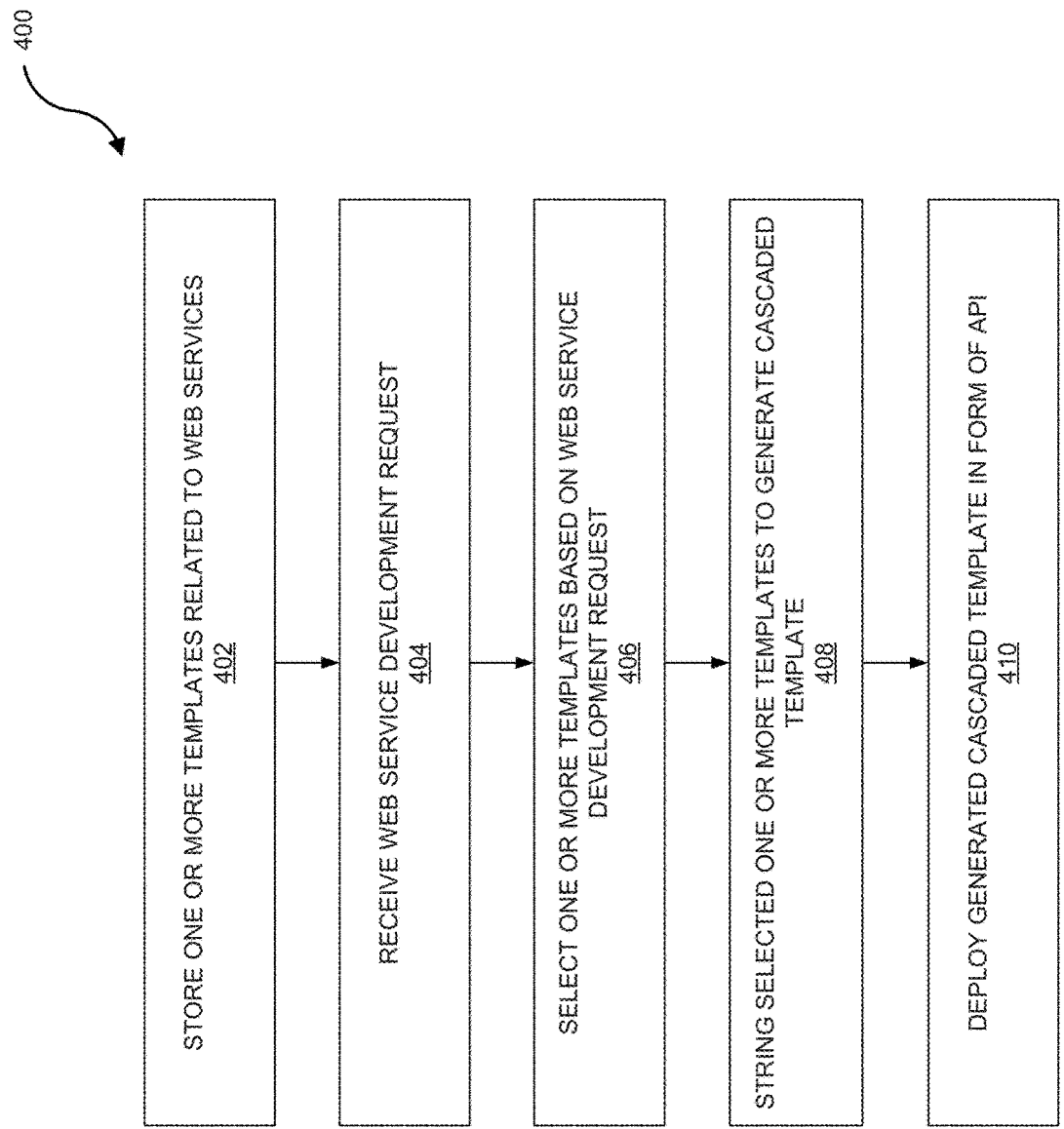

PLATFORM FOR WEB SERVICES DEVELOPMENT AND METHOD THEREFOR

The present disclosure relates to web services development and, more particularly, to a web services development platform and a method therefor which allows to develop web services in the form of an application programming; interface (API) requiring no or minimal code in a faster timeframe.

BACKGROUND

The emergence of web services represents the next evolution of e-business. Web services are Internet-based, modular applications that perform a specific business task while conforming to a defined technical format. This well-described standardized technical format ensures that each of these Internet-based, modular software applications or self-contained business services will easily integrate with other services to create a complete business process. By conforming to a set of adopted standards, web services format allows a business to dynamically publish, discover and bind (or invoke, for a user searching the web services) to a range of services to thereby simplify the process of creating innovative products, business processes and value chains.

Web service development generally has to go through complete development lifecycle, such as design, develop, compile, test and deploy, before it can go live to the end user. In existing art, developers are required to go through complete software development lifecycle before deploying any web service, which typically takes months to finish the project. Traditionally, different web services have required separate systems to handle user requests. For instance, each web service would need to develop separate code to handle security and user validation. This not only increased the time needed to develop these web services, but also resulted in creation of different web services even within the same company handling similar tasks for different scenarios.

Therefore, in light of the foregoing discussion, there exists a need to develop a framework for services development that allows separate web services to be developed in a common and consistent way that requires a minimal amount of development time.

SUMMARY

In a typical web service development project, it is believed that 95% of the use cases fall under any of the three categories simple, sequential or hierarchical. Each of these categories require certain type of coding that needs to be done. The present disclosure provides a web services development framework which implements a unique approach to reduce time to develop web services by reducing repetitions in the code.

In an aspect, a web services development platform is provided. The web services development platform comprises a central repository having stored therein a set of templates related to web services. The web services development platform further comprises a server including a processing system and a memory device. The memory device has instructions stored thereon that cause the processing system to perform operations comprising receiving a web service request from a user; selecting one or more templates from the set of templates based on the web service request; stringing the selected one or more templates to generate a cascaded template; and deploying the generated cascaded template in the form of an application programming interface (API) configured to establish communication with one or more of an external database and an external application.

In one or more embodiments, the set of templates are grouped under one of template patterns based on an operation type therefor, the template patterns including a select group, an update group, a delete group, and each of the template groups include one or more template patterns including at least one of a parent child template, a sequential template, and a multi-service template. Herein, the templates in the select group are configured to render a user query and return output data. Further, the templates in the update group are configured to perform one or more of update query and return status on the user query. Further, the templates in the delete group are configured to perform one or more of delete, drop and truncate operations based on a user query and return the status of the user query. Further, the parent child template is configured to process a user query as a parent query to generate one or more child queries and utilize the one or more child queries to render output from the parent query. Further, the sequential group template is configured to process multiple queries one after the other where output of one template is utilized by a successive user query as an input and returns final output. Further, the multi-service template is configured to utilize an output from user query of one web service to be used as an input by user query of other web service.

In one or more embodiments, the web services development platform further comprises a security layer for limiting access to the central repository for some users. Herein, the security layer implements LDAP (Lightweight Directory Access Protocol) for limiting access to the set of templates in the central repository based on credentials of the user.

In one or more embodiments, the web services development platform further comprises a service database integrated therewith and accessible to the user. The service database is configured to store data related to the received web service request.

In one or more embodiments, the web service request is replaced with a single line URL with following syntax:

{platformName}/{serviceName}/{OpType}/{templatePattern}/{stringTemplateGroup}/{stringTemplateName}.

In one or more embodiments, the server implements SMTP (Simple Mail Transfer Protocol) for sending data to and receiving data from the service database as notifications via emails.

In one or more embodiments, the server implements KAFKA messaging technique for establishing communication between the service database and the user, including for receiving the web service request to publish response from web service to a KAFKA topic.

In one or more embodiments, the generated cascaded template has a .stg extension.

In one or more embodiments, an output of the generated cascaded template is in the form of a JSON file.

In another aspect, a method for web services development is provided. The method comprises storing a set of templates related to web services; receiving a web service request from a user; selecting one or more templates from the set of templates based on the web service request; stringing the selected one or more templates to generate a cascaded template; and deploying the generated cascaded template in the form of an application programming interface (API) configured to establish communication with one or more of an external database and an external application.

In one or more embodiments, the set of templates are grouped under one of template groups based on an operation type therefor, the template groups including a select group, an update group and a delete group, and wherein each of the template groups include one or more template patterns including at least one of a parent child template, a sequential template, and a multi-service template.

In one or more embodiments, the method further comprises utilizing a security layer for limiting access to the central repository for specific users.

In one or more embodiments, the method further comprises implementing SMTP (Simple Mail Transfer Protocol) for sending data to and receiving data from the service database as notifications via email s and KAFKA messaging technique for establishing communication between the service database and the user, including for receiving the web service request, to publish events to subscribers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which:

FIG. 4 illustrates a flowchart depicting steps involved in a method for web services development in accordance with one or more exemplary embodiments of the present disclosure.

DETAILED DESCRIPTION

Figure 1:
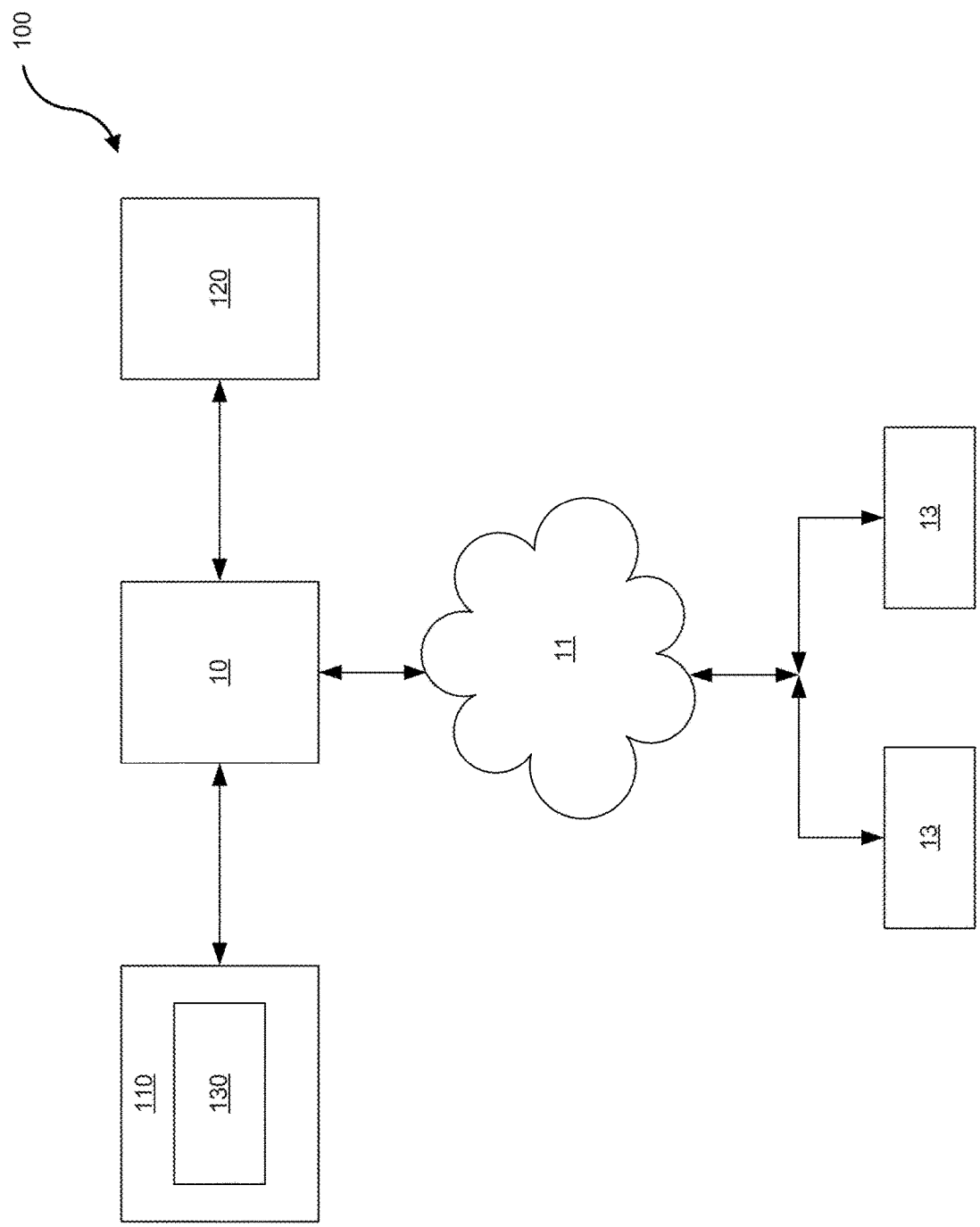
FIG. 1 illustrates a schematic of a web services development platform that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The present disclosure relates to web services development, more specifically, to a web services development platform and a method therefor. In disclosed implementations, the present disclosure may be embodied as a system, method, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Detailed embodiments of the present disclosure are described herein; however, it is to be understood that disclosed embodiments are merely exemplary of the present disclosure, which may be embodied in various alternative forms. Specific process details disclosed herein are not to be interpreted as limiting, but merely as a basis for the claims and as a representative basis for teaching one skilled in the art to variously employ the present disclosure in any appropriate process for creating digital content.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the Internet.

The detailed description which follows is represented largely in terms of processes and symbolic representations of operations in a distributed computing environment by conventional computer components, including remote file servers, remote computer servers, remote memory storage devices, a processing unit, memory storage devices, display devices and input devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text. Therefore, disclosure of a particular set of program code instructions is not considered necessary for an adequate understanding of how to make and use the invention. The inventive functionality of the claimed system will be explained in more detail in consideration of the following description read in conjunction with the appended figures.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as SQL, JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

FIG. 1 illustrates a computer network system 100 (sometimes, simply referred to as system 100), according to one or more embodiments of the present invention. As shown in FIG. 1, an exemplary computer network system 100 for implementing processes according to embodiments of the present invention may include, but is not limited to, a general-purpose computing device 10 that interacts with users through a network, such as, but not limited to, the Internet. The computing device 10 may be a server 10 that communicates over the network 11 with user devices 13, which include, but are not limited to, general-purpose computers, special-purpose: computers, mainframes, gaming devices, tablet computers, smartphones, PDAs, audio editors, text readers, text editors, video players, video editors, image/graphic readers, image/graphic editors, a processor-based device, and the like. The user devices 13 may communicate with the server 10 through a web site or through another type of software interface. The user devices 13 may communicate with the server 10 through one or more applications including computer-executable instructions. Alternative embodiments may not involve a network at all, and may instead be implemented on a standalone device 10 used by the user(s). The server 10 may be implemented as a network of computer processors. In some implementations, the server 10 may be multiple servers, mainframe computers, networked computers, a processor-based device, or a similar type of system or device. In some implementations, the server 10 may be a server farm or datacentre. The server 10 may receive connections through a load-balancing server or servers. In some implementations, a task may be divided among multiple servers 10 that are working together cooperatively.

Figure 2:
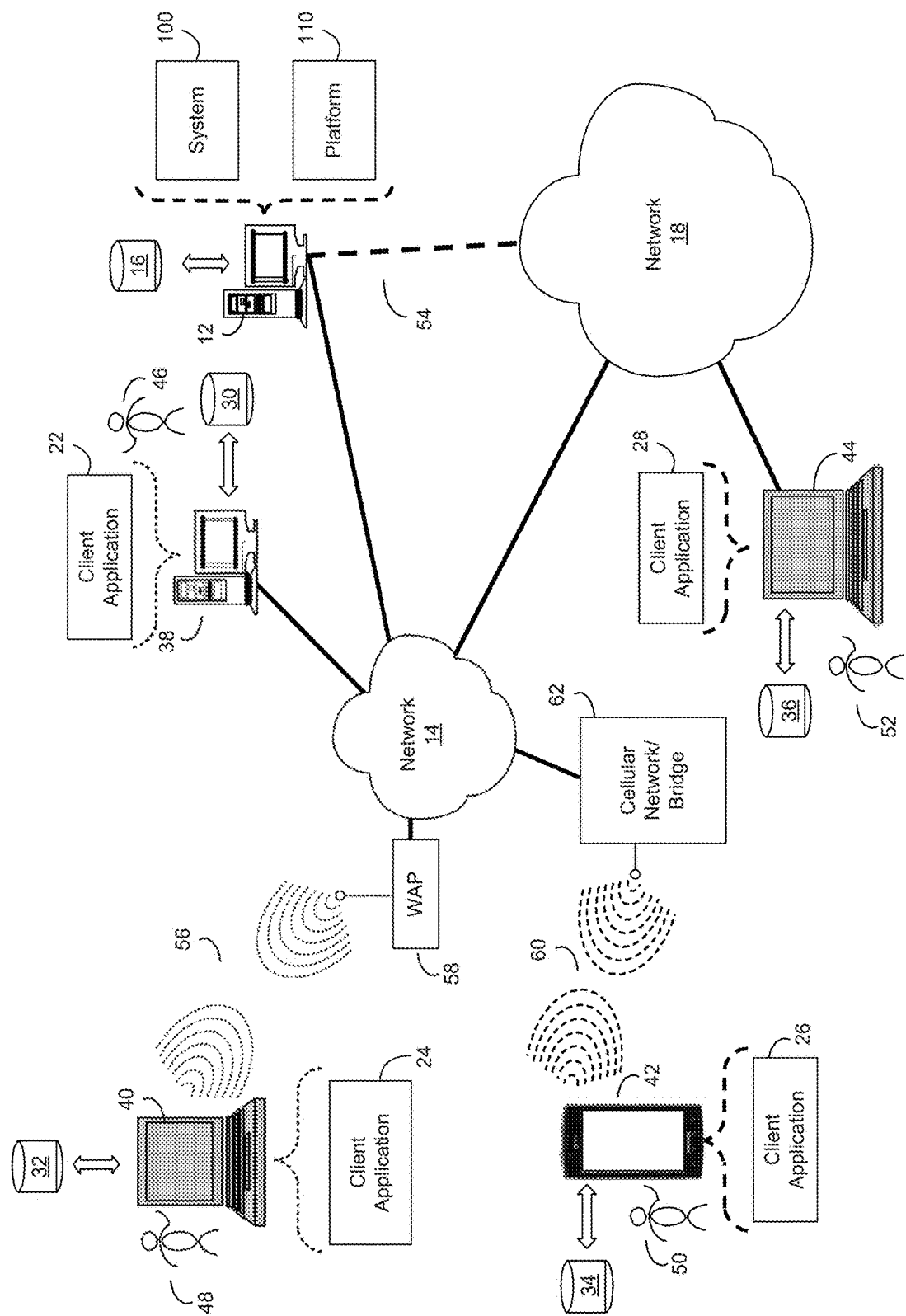
FIG. 2 illustrates a schematic of a system for implementing a method for web services development, in accordance with one or more exemplary embodiments of the present disclosure.

Referring now to the example implementation of FIG. 2, there is shown an embodiment of the system 100 that may reside on and may be executed by a computer (e.g., computer 12), which may be connected to a network (e.g., network 14) (e.g., the internet or a local area network) for implementing the embodiments of the present disclosure. Examples of computer 12 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United. States, other countries or both; and Linux is a registered trademark of Linus Torvalds in the United States, other countries or both).

In some implementations, the instruction sets and subroutines of system 100, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, system 100 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute platform 110 for web services development. In some implementations, system 100 and/or platform 110 may be accessed via one or more of client applications 22, 24, 26, 28. In some implementations, system 100 may be a standalone application, or may be an applet/application/script/extension that may interact with and/or be executed within platform 110, a component of platform 110, and/or one or more of client applications 22, 24, 26, 28. In some implementations, platform 110 may be a standalone application, or may be an applet/application/script/extension that may interact with and/or be executed within system 100, a component of system 100, and/or one or more of client applications 22, 24, 26, 28. In some implementations, one or more of client applications 22, 24, 26, 28 may be a standalone application, or may be an applet/application/script/extension that may interact with and/or be executed within and/or be a component of system 100 and/or platform 110. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to user devices 38, 40, 42, 44, may be executed by one or more processors and one or more memory architectures incorporated into user devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of user devices 38, 40, 42, 44 (and/or computer 12) may include, but are not limited to, a personal computer (e.g., user device 38), a laptop computer (e.g., user device 40), a smart/data-enabled, cellular phone (e.g., user device 42), a notebook computer (e.g., user device 44), a tablet (not shown), a server (not shown), a television (not shown), a smart television (not shown), a media (e.g., video, photo, etc.) capturing device (not shown), and a dedicated network device (not shown). User devices 38, 40, 42, 44 may each execute an operating system, examples of which may include but are not limited to, Android®, Apple® iOS®, Mac® OS X®; Red Hat® Linux®, or a custom operating system.

In some implementations, one or more of client applications 22, 24, 26, 28 may be configured to effectuate some or all of the functionality of system 100 (and vice versa). Accordingly, in some implementations, system 100 may be a purely server-side application, a purely client-side application, or a hybrid server-side/client-side application that is cooperatively executed by one or more of client applications 22, 24, 26, 28 and/or system 100.

In some implementations, one or more of client applications 22, 24, 26, 28 may be configured to effectuate some or all of the functionality of platform 110 (and vice versa). Accordingly, in some implementations, platform 110 may be a purely server-side application, a purely client-side application, or a hybrid server-side/client-side application that is cooperatively executed by one or more of client applications 22, 24, 26, 28 and/or platform 110. As one or more of client applications 22, 24, 26, 28, system 100, and platform 110, taken singly or in any combination, may effectuate some or all of the same functionality, any description of effectuating such functionality via one or more of client applications 22, 24, 26, 28, system 100, platform 110, or combination thereof, and any described interaction(s) between one or more of client applications 22, 24, 26, 28, system 100, platform 110, or combination thereof to effectuate such functionality, should be taken as an example only and not to limit the scope of the disclosure.

In some implementations, one or more of users 46, 48, 50, 52 may access computer 12 and system 100 (e.g., using one or more of user devices 38, 40, 42, 44) directly through network 14 or through secondary network 18. Further, computer 12 may be connected to network 14 through secondary network 18, as illustrated with phantom link line 54. System 100 may include one or more user interfaces, such as browsers and textual or graphical user interfaces, through which users 46, 48, 50, 52 may access system 100.

In some implementations, the various user devices may be directly or indirectly coupled to network 14 (or network 18). For example, user device 38 is shown directly coupled to network 14 via a hardwired network connection. Further, user device 44 is shown directly coupled to network 18 via a hardwired network connection. User device 40 is shown wirelessly coupled to network 14 via wireless communication channel 56 established between user device 40 and wireless access point (i.e., WAP) 58, which is shown directly coupled to network 14. WAP 58 may be, for example, an IEEE 802.11a, 802.11b, 802.11g, Wi-Fi®, EMI), and/or Bluetooth™ (including Bluetooth™ Low Energy) device that is capable of establishing wireless communication channel 56 between user device 40 and WAP 58. User device 42 is shown wirelessly coupled to network 14 via wireless communication channel 60 established between user device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC) may also be used.

Referring back to FIG. 1, the computer network system 100 makes use of several interoperating components. According to embodiment of the present disclosure, the computer network system 100 provides a web services development platform, schematically represented and indicated by numeral 110 and also sometimes simply referred to as platform 110. The platform 110 includes a central repository, schematically represented and indicated by numeral 120. The central repository 120 is in the form of a database or having .stg files in any storage system. The platform 110 may further include a service database 130 which is configured to handle data management, including user accounts, group state and statistics, lead history, among other data. The service database 130 is integrated with the platform 110 and is accessible to the user. The service database 30 is configured to store data related to the received web service development request. The platform 110 provides services such as, for example, authentication, dynamic webpage generation, and an interface front end to the central repository 120. In one or more embodiments, the web services development platform 110 may include any applicable web server such as, for example, Apache™ (available from http://httpd.apache.org), Node.js (available from http://nodejs.org/), Twisted (available from http://twistedmatrix.com), MongreL2™ (available from http://mongrel2.org), that supports a web application framework (e.g., Django® (available from Django Software Foundation) or INode.js™ (available from http://nodejs.org/)). Django® is a powerful Web-Application Framework, providing support for numerous backend databases, powerful authentication, dynamic webpage generation, and URL-address parsing. As Django is written in Python, a powerful scripting language, it is well suited for parsing and manipulating various forms of text-based data, such as HEW, XML and human-readable data, like chat messages.

In some embodiments, the central repository 120 can be a part of the platform 110 or can be a part of a stand-alone database server communicatively coupled to the server 10. Examples of database management system for controlling, maintaining and using the central repository 120 include MongoDB® and Cassandra. MongoDB® is a scalable, high-performance, open-source NoSQL database management system that provides powerful replication and high availability, allowing horizontal scaling without compromising functionality. In addition, NoSQL: database management systems are suitable for databases requiring many writes and sequential reads. This is in contrast to relational databases, such as MySQL, which are good for relational queries, but perform poorly for frequent writes and sequential reads, especially for massive quantities of data. Such a database management system provides many features well-suited to enabling collaboration groups, including rich, document-based queries, flexible aggregation and data processing, and the ability to store files of any size without complicating the stack. Preferably, the central repository 120 is configured to handle large amounts of data spread across many commodity servers, providing a highly available service with no single point of failure.

Through the user devices 13, a user (such as, a web developer) registers with the platform 110, which in turn creates an account or profile for the user and stores the profile in the central repository 120 and/or the service database 130 which may act as access management directory, such as Active directory, Open LDAP, etc. Hereinafter the terms "user", "web developer" and "developer" have been interchangeably used for the purpose of the present disclosure without any limitations. The user profile may include, for example, identification information and contact information associated with the web developer and a record of the web developer's activity in the platform 110. The user profile may also include personal information supplied by the web developer, e.g., websites, programming language preferences, professional experience, etc. According to some embodiments, the central repository 120 and/or the service database 130 is configured to provide means, such as storage devices, for storing and retrieving profiles of the plurality of web developers.

Figure 3:
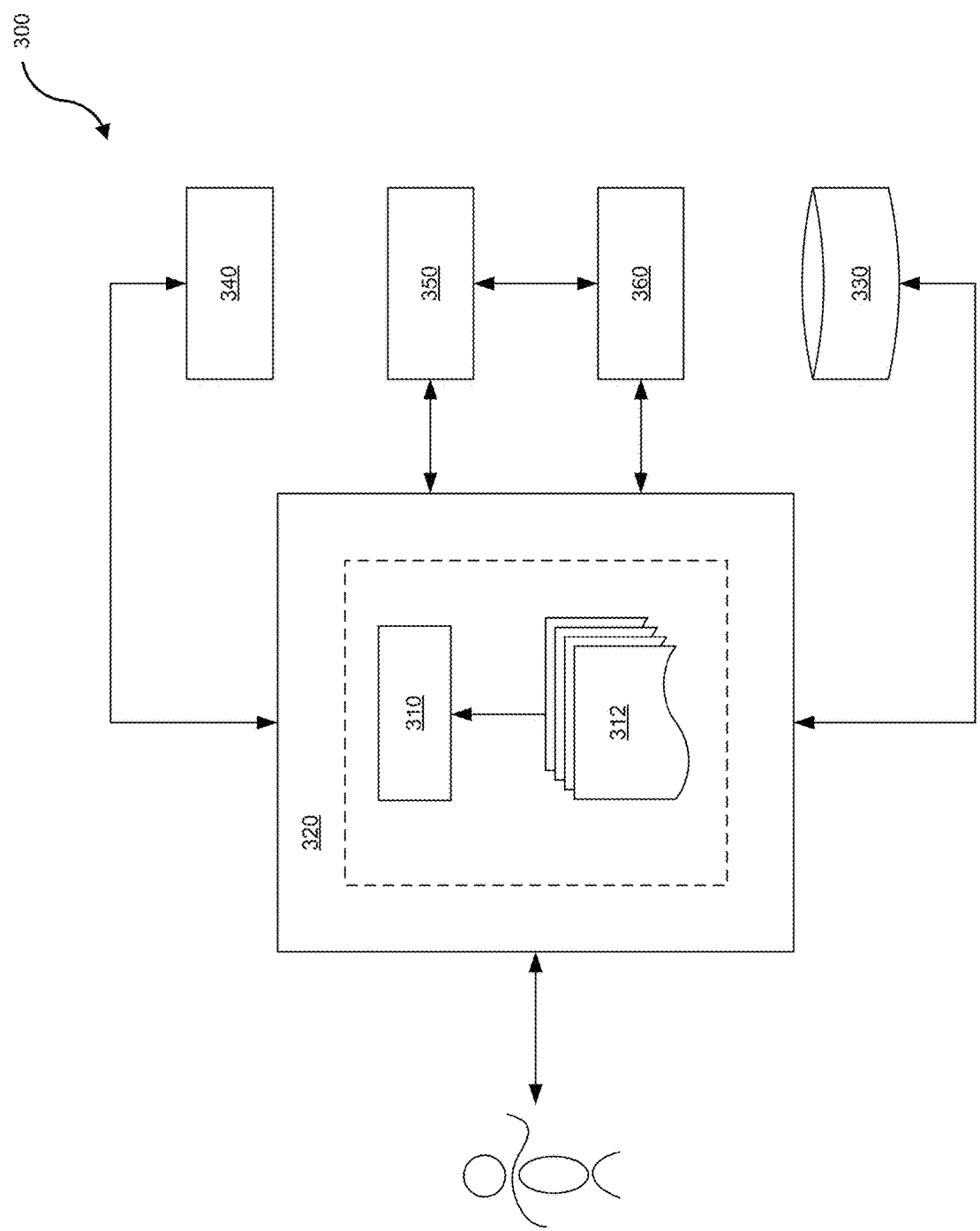
FIG. 3 illustrates an architecture diagram of the web services development platform, in accordance with one or more exemplary embodiments of the present disclosure.

Referring now to FIG. 3, illustrated is an architecture of a web services development platform 300 (such as, the platform 110), according to embodiments of the present disclosure. The web services development platform 300 is a lightweight and robust framework which is used for rapid web service development process. As schematically illustrated in FIG. 3, the web services development platform 300 includes a central repository 310 (similar to the central repository 120). The web services development platform 300 also includes a server 320 (similar to the server 10). The server 320 includes a processing system and a memory device (not shown), as conventionally associated with a computing device. The memory device of the server 320 has instructions stored thereon that cause the processing system to perform operations related to a method for web services development. FIG. 4 depicts a flowchart 400 listing steps involved in the said method for web services development.

At step 402, the method includes storing a set of templates 312 related to web services. The central repository 120 have the set of templates 312 stored therein. In the present embodiments, the set of templates 312 are related to web services development. It may be appreciated that the templates 312 may be pre-built based on different requirements for web service development. Templates are used to deploy any user task, based on the use case a template is created and deployed on the template database.

As discussed, in a typical web service development project, most of the use cases fall under any of the three categories: simple, sequential or hierarchical. Each of these categories require certain type of coding that needs to be done. In the present embodiments, the templates in the set of templates 312 are grouped under one of template groups based on an operation type therefor. Herein, the template groups include a select group, an update group and a delete group. Each of the template groups include one or more template patterns including a parent child template, a sequential template, and a multi-service template. Herein, the output from one template can be used by other templates.

At step 404, the method includes receiving a web service request from a user. The web service request may be about performing different database operations, and there is generally no limitation on the operations being performed. In the present embodiments, the web service request is in the form of a Uniform Resource Locator (URL). In one or more embodiments, the web service request is replaced with a single line URI, with following syntax: {PlatformName}/{serviceName}/{OpType}/{templatePattern}/{stringTemplateGroup}/{stringTemplateName}. The server 320 analyses the URL requested and loads the required template from the central repository 310. Once the template is loaded, it interacts with external environment. Herein, the "platformName" may include the name associated with the web services development platform 300. The "serviceName" may include the name of the service to be executed. In one or more examples, the different types of services available, but not limited to, are: JDBC, Hive, Solr, Mongodb, Artifacts and the like, as known in the art. Other services can be provided on user demand. The "OpType" may generally include the information about an operation type to be performed and the "templatePattern" may generally include the information about the group of template pattern to be employed. Further, the "stringTemplateGroup" and the "stringTemplateName" may generally include the information about the output type required in which "stringTemplateGroup" refers to the group of string templates and "stringTemplateName" is name of the query which exposes the REST API data.

At step 406, the method includes selecting one or more templates from the set of templates 312 based on the web service request. In particular, the selected one or more templates are based on the operation to be performed. As discussed, the operation type may be categorized under one of Select (Sel) operation type in which all the select queries are listed; update (Upd) operation type in which all the create update and insert queries are listed; and Delete (Del) operation type in which all the delete, drop and truncate queries are listed.

At step 408, the method includes stringing the selected one or more templates from the set of templates 312 to generate a cascaded template. Further, at step 410, the method includes deploying the generated cascaded template in the form of an API configured to establish communication with one or more of an external database and an external application. In the present embodiments, the generated cascaded template has a .stg extension. The cascaded template is created as a new API based on request mapping path which requires a template parameter that can be dynamically configured. Herein, an API is defined as a set of functions and procedures allowing the creation of applications that access the features or data of an operating system, application, or other services. Herein, the template in the .stg file is created and its appropriate endpoint for the template is automatically generated.

In the present embodiments, the templates in the select group are configured to render a user query and return output data. Also, herein, the templates in the update group are configured to perform one or more of update and insert operations based on a user query. Further, herein, the templates in the delete group are configured to perform one or more of delete, drop and truncate operations based on a user query. Further, the parent child template is configured to process a user query as a parent query to generate one or more child queries and utilize the one or more child queries to render output from the parent query. It may be understood that child query output will be added back with a new key in the output data. Generally, OutputMap of a parent query is in JSON string format. If OutputMap has a list with a single element, it returns a JSON string. If OutputMap has a list with more than a single element, it returns a JSON Array string. Further, merged parent-child query output is a JSON exposed as Rest API. In the present examples, a parent child query is formed using the following terms: (i) query_template_group for template group path of parent query; (ii) query_template_name for parent query template name; (iii) query_inputs for input to the parent child queries in which input data can be converted to map using asMap (eg: $data,aMap$) or a string using asString (eg: $data.asString$); (iv) child for child queries to be rendered as a list of maps. Herein, a child query has the following parameters: a) query_template_group: Template group path of child query; b) query_template_name: Child query template name; c) relation key: Relation key between the parent and child query (i.e., columns in parent query to reuse in the child queries); and d) query_output_key: child query output added as a key in output JSON.

In an example, the parent child query works to get the customer data, phone data and the address data which are in different tables as a single exposable API. Herein, customer, phone and address table uses customer_id as its natural key. In parent, parent query initially gets the customer id from the 'getSingleCustomer' template. In child 1, child query consumes the parent data on relation key (customer_id) and the output data is stored in query_output_key (phone key) in the output map. In child 2, child query consumes the parent data on relation key (customer_id) and the output data is stored in query_output_key (address key) in the output map.

Furthermore, herein, the sequential template is configured to pass on the output of a user query, to be utilized by a successive user query as an input. That is, queries in the sequential pattern can pick the output from other queries in the sequence. Herein, each query output will be added to a Data Map (i.e., a map with keys where the keys store the query outputs) with the key provided in input. A sequential query is formed using the following terms: (i) input_data which is input to the parent child queries and in which input data initially is in JSONString but can be converted to map using asMap (eg: $data.asMap$) or a string using asString (eg: $data.asString$); (ii) query_template_group which is template group path of parent query; (iii) query_template_name which is parent query template name; and (iv) query_output_key in which child query output added as a key in output JSON and (v) query_type which may be: (a) select in which query from template is rendered to an OutMap; (b) insert, update, delete in which query from template is rendered and updated in the backend database; (c) html, string in which query from template is rendered as is and presented in template; (d) data, JSON in which output from rendered template is in the form of a JSON; (e) JSONmapper, again, in which output from rendered template is in the form of a JSON; and (f) Encoded_string in which output from rendered template is in the form of an encoded string.

In an example, the sequential query gets the customer data, phone data and the address data which are in different tables as a single exposable API. Herein, customer, phone and address table uses customer_id as its natural key. First, sequential_query gets the customer details using the getSingleCustomer template. Then, sequential_query gets the phone details of the customer consuming the customer details from the getSingleCustomer template. And thereafter, sequential query gets address details of the customer consuming the customer details from the getSingleCustomer template.

In some implementations, the sequential query also has the option to process the output data from the sequential query using a java class. In such case, a process logic query is formed using the following terms: (i) processLogic in which output of java class is used to put in the template map; (ii) processClass which is java class to process the data; (iii) result_key which is output of the java class added as a key in the JSON; (iv) query_output_key in which child query output is added as a key in output JSON; and (v) query_type which further includes (a) select in which query from template is rendered to an OutMap; (b) insert, update, delete: query from template is rendered and updated in the backend database; (c) html, string in which query from template is rendered as is and presented; (d) data, JSON in which output from rendered template as a JSON; (e) JSONrnapper which provides output from rendered template as a JSON; and (f) Encoded_string which provides output from rendered template as an encoded string. It may be appreciated that additional keys may be added into the processLogic map to process the data.

Furthermore, herein, the multi-service template is configured to utilize an output from user query of one web service to be used as an input by user query of other web service. A multiservice query is formed using the following terms: (a) request type which is REST API request type; (b) use: IncomingHeaders which provides whether to use incoming headers for this API; (c) end_point_template_group which is the template group where end point is defined; (d) end_point template name which is the template name where end point is defined; (e) dependent_output_keys which provides the keys on which it is dependent on; (f) useIncomingData which provides whether to use incoming data for this API; (g) continue chain if errored which provides whether to continue if this API error occurs; (h) output_type which provides output type which the API returns (i) output key which provides information about in which key it should store the output.

In one example, the multi-service template may be implemented to get the customer data from postgres and the order data from hive, which are different service types in the framework. First, multiservice query gets the customer details from postgres and is stored in output key (customer data), and then multiservice query consumes the customer data from the first sequential query and stores the order details in output key (order data).

Referring back to FIG. 3, as illustrated, the web services development platform 300 includes a service database 330 (similar to the service database 130) accessible to the user. The service database 330 is configured to store data related to a received web service request. In one implementation, the service database 330 includes information including the web services development projects that the user may have worked on in the past. This allows the user to quickly access the created templates and related information, as required. In general, the service database 330 is the location where all the user data is stored to be accessed as per the requirement.

The web services development platform 300 may also include a security layer 340 for limiting access to the central repository 310 to specific users. The security layer 340 ensures a secure environment for the web services development platform 300 to run, as it deals with sensitive data. The security layer 340 includes firewalls and other securities installed. In one or more embodiments of the present disclosure, the security layer 340 is implemented as a LDAP (Lightweight Directory Access Protocol) or any other access protocol such as PAM (Privileged Access Management) server 340 for limiting access to the one or more templates 312 as stored in the central repository 310 based on credentials of the user; however, it may be appreciated that any other suitable protocol may be implemented for such purpose without departing from the scope and spirit of the present disclosure. The server 320 searches the LIMP server 340 for the user credentials and evaluates whether the user has privileges to carry out the task and set permissions to the user access. This helps in having control on user classes and their privileges.

In one implementation, the web services development platform 300 can be defined to generate multiple patterns which help in sending KAFKA (which is an open source platform by Apache) messages or send an email request to the SMTP server. For this purpose, as illustrated in FIG. 3, the server 320 implements SMTP (Simple Mail Transfer Protocol) (represented as a block with the numeral 350) for sending data to and receiving data from the service database. In general, the server 320 follows SMTP standards for sending and receiving data between various components in the web services development platform 300 to ensure safety of data during the transfer. Further, as illustrated, the server 320 implements KAFKA messaging technique (represented as a block with the numeral 360) for communication with the user or external services based on web service request. In general, the server 320 implements KAFKA messaging technique to establish communication between two components in an internal framework, it may be appreciated that many other mapping requests can be deployed which contains the configurable templates without any limitations.

In the present web services development platform 300, cascade templates are created and deployed to execute the business logic of web service as a custom query template or any existing service pre-processor. The framework can provide APIs which expose data to the external applications. There can be a two-way communication from the external application to various databases. Using the web services development platform 300, different database operations can be performed. There is no limitation on the operations being performed. The response provided by the web services development platform 300 is a light-weight file namely JSON, but in other examples it can be XML file, HTML file or simple string based on the requirement.

The web services development platform 300 of the present disclosure is a development framework/environment which templatize the web service developmental activities by providing users with tools for faster and low code deployment. The web services development platform 300 accelerates the development of web services by automating code generation, and provides hassle-free building and deployment. The web services development platform 300 provides developers with environment that help them reduce time to develop web services, automates most of the general functions which can be simple, sequential or hierarchical in nature and make the process of developing a service faster. It provides developers with instantly usable templates which they can use to directly deploy the feature. Generally, the web services development platform 300 of the present disclosure may cover 95% of the use cases that are being used by developers to develop a web service. This way, the web services development platform 300 helps developers in reducing time for design, develop, compile, test and deploy, and also unlock potential to develop web service at a faster pace for delivery to the clients.

In particular, the web services development platform 300 enables developers to call different string templates as per the business requirement, which in turn reduces time to develop the code. The web services development platform 300 provides various facilities to develop plugins with the external systems, supports databases and provides REST (Representational State Transfer) API interface. The web services development platform 300 reduces the load of rendering multiple API data to a single API. The web services development platform 300 can provide APIs which expose data to the external applications; for example, there can be a two-way communication from the external application to various databases. The web services development platform 300 allows to perform different database operations, and there is generally no limitation on the operations being performed.

The present web services development platform 300 is robust as it is designed with a full complement of compatibilities, like using string cascaded templates, it can be used to send a KAFKA message or generate an email request using the SMTP server or authenticate a user using LDAP service. The web services development platform 300 can be used to develop web services for any type of platform, like different operating systems and the like. The web services development platform 300 is scalable as it can help the user (developer) to create multiple API's with existing available patterns and supports the development of custom patterns; and is easy to maintain for the user as it has no or minimal maintenance. The web services development platform 300 is lightweight in code as it is not required to define database entities or objects in the framework. Also, the defined service layer is reusable to all the API's. The web services development platform 300 is adaptable to any system; for example, as discussed in preceding paragraphs, it can be integrated to any external systems like KAFKA, SMTP. The web services development platform 300 provides for rapid development as the developer does not need to write code from scratch, like for developing a new web service, and it is just needed to develop a new template (cascaded template) with the existing patterns.

The difference between a traditional application and the web services development platform 300 of the present disclosure is that in the traditional approach when a new API is created, the business logic has to be updated and re-deployed whereas in the present web services development platform 300 of the present disclosure only a template is created and can be directly used without the need for deployment.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A web services development platform, comprising:
a central repository data store having stored therein a set of templates related to web services; and
a server computing device including a processor coupled to a memory device having computer-executable instructions stored thereon that, when executed by the processor, cause the platform to perform operations comprising:
receiving a web service request from a user;
selecting one or more templates from the set of templates in response to the web service request;
stringing the selected one or more templates to generate a cascaded template; and
deploying the generated cascaded template in the form of an application programming interface (API) configured to establish communication with one or more of an external database and an external application.

2. The platform of claim 1, wherein each template in the set of templates is grouped under one of template groups composed of: a select group, an update group and a delete group, and wherein each of the template groups includes one or more template patterns including at least one of a parent child template, a sequential template, and a multi-service template.

3. The platform of claim 2, wherein each template in the select group is configured to render a user query and return output data.

4. The platform of claim 2, wherein each template in the update group is configured to perform one or more of update and insert operations based on a user query.

5. The platform of claim 2, wherein each template in the delete group is configured to perform one or more of delete, drop and truncate operations based on a user query.

6. The platform of claim 2, wherein the parent child template is configured to process a user query as a parent query to generate one or more child queries and utilize the one or more child queries to render output from the parent query.

7. The platform of claim 2, wherein the sequential template is configured to pass on the output of a user query, to be utilized by a successive user query as an input.

8. The platform of claim 2, wherein the multi-service template is configured to utilize an output from user query of one web service to be used as an input by user query of other web service.

9. The platform of claim 1 further comprising a security layer for limiting access to the central repository for some users.

10. The platform of claim 1 further comprising a service database is integrated therewith and accessible to the user, wherein the service database configured to store data related to the received web service development request.

11. The platform of claim 1, wherein the web service request is replaced with a single line URL with syntax comprising: {platformName}/{serviceName}/{OpType}/{templatePattern}/{stnngTemplate Group}/{stringTemplateName}.

12. A computer-based method for web services development, the method comprising executing computer-readable instructions at a processor that cause:
storing a set of templates related to web services in a data store;
receiving a web service request from a user of a remote computing device;
selecting one or more templates from the set of templates based on the web service request;
stringing the selected one or more templates to generate a cascaded template; and
deploying the generated cascaded template in the form of an application programming interface (API) configured to establish communication with one or more of an external database and an external application.

13. The method of claim 12, wherein each template in the set of templates is grouped under one of the template groups composed of, an update group and a delete group, and wherein each of the template groups include one or more template patterns including at least one of a parent child template, a sequential template, and a multi-service template.

* * * * *

UNITED STATES PATENT AND TRADEMARK OFFICE
CERTIFICATE OF CORRECTION

PATENT NO. : 11,281,438 B2
APPLICATION NO. : 17/181342
DATED : March 22, 2022
INVENTOR(S) : Chitgupakar et al.

It is certified that error appears in the above-identified patent and that said Letters Patent is hereby corrected as shown below:

In the Claims

Column 18 Line 14 Claim 11, Please replace "{stnngTemplate Group}" with "{stringTemplateGroup}"

Signed and Sealed this
Twenty-sixth Day of April, 2022

Katherine Kelly Vidal
*Director of the United States Patent and Trademark Office*